(12) United States Patent　　(10) Patent No.: US 7,095,212 B2
Sudo et al.　　(45) Date of Patent: Aug. 22, 2006

(54) BATTERY PACK WITH A REMAINING BATTERY POWER CALCULATING FUNCTION

(75) Inventors: Minoru Sudo, Chiba (JP); Takashi Niwa, Chiba (JP); Norio Chiba, Chiba (JP); Susumu Ichihara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 182 days.

(21) Appl. No.: 10/815,444

(22) Filed: Apr. 1, 2004

(65) Prior Publication Data

US 2004/0232889 A1　　Nov. 25, 2004

(30) Foreign Application Priority Data

Apr. 11, 2003　(JP) .............................. 2003-107393

(51) Int. Cl.
*H02J 7/00* (2006.01)
(52) U.S. Cl. ....................... 320/136; 320/132; 320/106
(58) Field of Classification Search ................ 320/136, 320/106, 116, 118, 162, 132
See application file for complete search history.

(56) References Cited

U.S. PATENT DOCUMENTS 5,017,856 A * 5/1991 Johnson, Jr. ................. 320/106
5,493,197 A * 2/1996 Eguchi et al. ............... 320/116
5,530,336 A * 6/1996 Eguchi et al. ............... 320/118
6,448,743 B1 * 9/2002 Sano et al. .................. 320/162

FOREIGN PATENT DOCUMENTS

JP　　2002151163　　* 11/2000

* cited by examiner

*Primary Examiner*—Pia Tibbits
(74) *Attorney, Agent, or Firm*—Adams & Wilks

(57) ABSTRACT

A battery pack has a secondary battery connected to a plus side terminal. A protective circuit protects the secondary battery from overcharge and over-discharge. A calculation circuit operates with a minus side terminal as a reference for calculating a remaining capacity of the secondary battery. An N-channel MOS transistor is connected between the secondary battery and the minus terminal for controlling charge and discharge of the secondary battery in accordance with a signal from the protective circuit. A level shifter circuit is connected between the calculation circuit and a communication terminal.

16 Claims, 3 Drawing Sheets

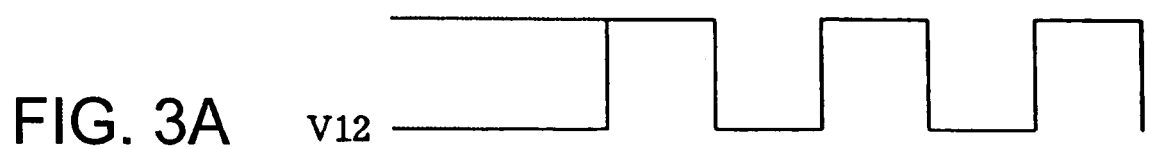
FIG. 3A  V12
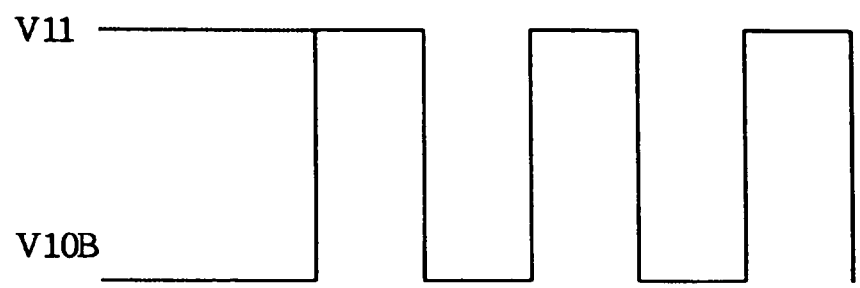
FIG. 3B  V11 / V10B
FIG. 4
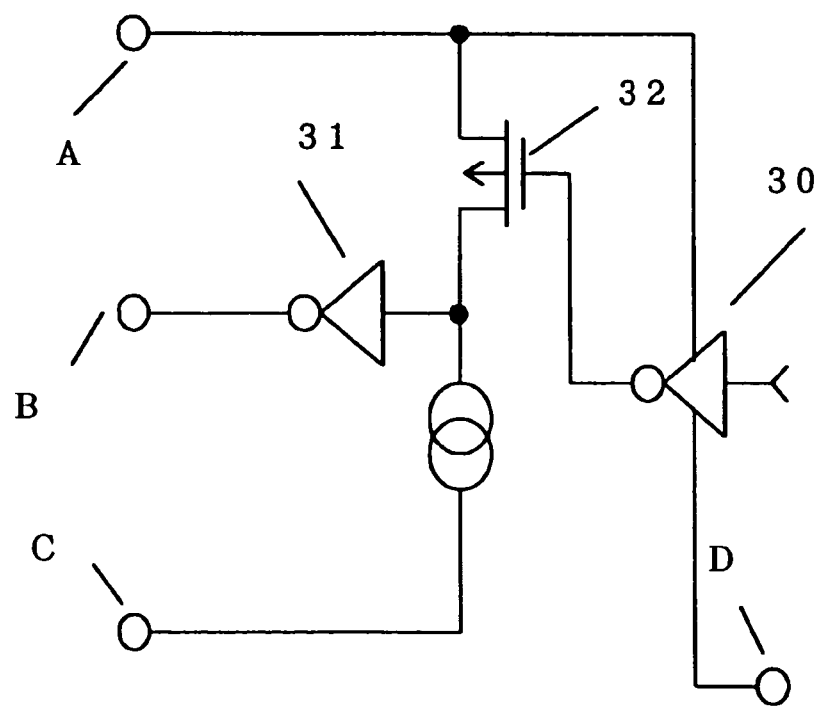

BATTERY PACK WITH A REMAINING BATTERY POWER CALCULATING FUNCTION

BACKGROUND OF THE INVENTION

1. Field of the Invention

The present invention relates to a battery pack with a remaining battery power calculating function (hereinafter referred to as smart battery pack) which is reduced in cost and improved in performance.

2. Description of the Related Art

Smart battery packs of prior art use P-channel MOS transistors on the Hi side (see JP 2002-151163 A, pages 3 through 6, FIG. 1, for example). This can be seen in a circuit diagram of FIG. 5, which illustrates a conventional smart battery pack. The circuit in FIG. 5 has a plus side terminal 11, a minus side terminal 12, and terminals 13 and 14 for communicating with an electronic device. Although the battery pack in FIG. 5 has two communication terminals, only one communication terminal may be provided instead. The terminals 11 through 14 are connected to the electronic device or a charger. The smart battery pack contains a secondary battery 10, a protective circuit 1 for protecting the secondary battery 10, a circuit 2 for calculating the remaining capacity of the secondary battery 10, a resistor 3 for current detection, P-channel MOS transistors 4 and 5, and others.

The protective circuit 1 controls ON/OFF of the P-channel MOS transistors 4 and 5 in accordance with the state of the secondary battery 10. For instance, when the secondary battery 10 is in an over-discharged state, the protective circuit 1 turns the P-channel MOS transistor 4 off to prohibit discharge whereas the protective circuit 1 turns the P-channel MOS transistor 5 off to stop charging when the secondary battery 10 is in an overcharged state. In the case of lithium ion secondary batteries, a protective circuit is generally incorporated in a battery pack as a measure to enhance the safety level.

The circuit 2 for calculating the remaining capacity of the secondary battery 10 monitors the voltage of the secondary battery 10 as well as the electric potential on each end of the current detection resistor 3 to measure a charge current, a discharge current, and the like. The measurement results are transmitted to the electronic device through the communication terminals 13 and 14 (upon request of the electronic device).

The battery pack communicates with the electronic device in accordance with the GND reference, in other words, with the electric potential of the terminal 12 as the reference (hereinafter the GND reference means using the electric potential of the terminal 12 as the reference).

For the purpose of discussion, if an N-channel MOS transistor is used on the Lo side, the lower side electric potential of the secondary battery serves as the reference electric potential of the circuit for calculating the remaining capacity of the secondary battery of the battery pack, and does not match the GND reference electric potential of the electronic device. Accordingly, the battery pack and the electronic device cannot communicate with each other.

When the conventional smart battery pack communicates with the electronic device using the lower electric potential of the electronic device as the reference, a Hi side transistor of the battery pack has to be a P-channel MOS transistor. This is a problem since P-channel transistors in general have poorer mobility and characteristics compared to N-channel MOS transistors.

SUMMARY OF THE INVENTION

The present invention has been made to solve the foregoing problem of the prior art, and an object of the present invention is therefore to provide a smart battery pack using an N-channel MOS transistor, which has characteristics superior to those of a P-channel MOS transistor, on the Lo side of the smart battery pack.

According to the present invention, there is provided a battery pack with a remaining battery power calculating function, including: a secondary battery connected between a plus side terminal and a minus side terminal; a protective circuit for protecting the secondary battery from overcharge and over-discharge; a circuit operating with the minus side terminal as the reference to calculate a remaining capacity of the secondary battery; and an N-channel MOS transistor for controlling charge and discharge of the secondary battery upon receiving a signal from the protective circuit in order to protect the secondary battery. The battery pack further includes a level shifter circuit provided for a level shift of an electric potential of the minus side terminal to a negative electrode side electric potential of the secondary battery.

BRIEF DESCRIPTION OF THE DRAWINGS

In the accompanying drawings:

FIGS. 3A and 3B are diagrams illustrating the operation of the level shifter circuit;

FIG. 4 is a diagram showing another example of a level shifter circuit used in a smart battery pack of the present invention.

DETAILED DESCRIPTION OF THE PREFERRED EMBODIMENT

In order to enable a smart battery pack that uses an N-channel MOS transistor on the Lo side to communicate with an electronic device, the voltage level of a communication terminal of a circuit for calculating the remaining capacity of a secondary battery is set equal to the voltage level of the electronic device.

Figure 1:
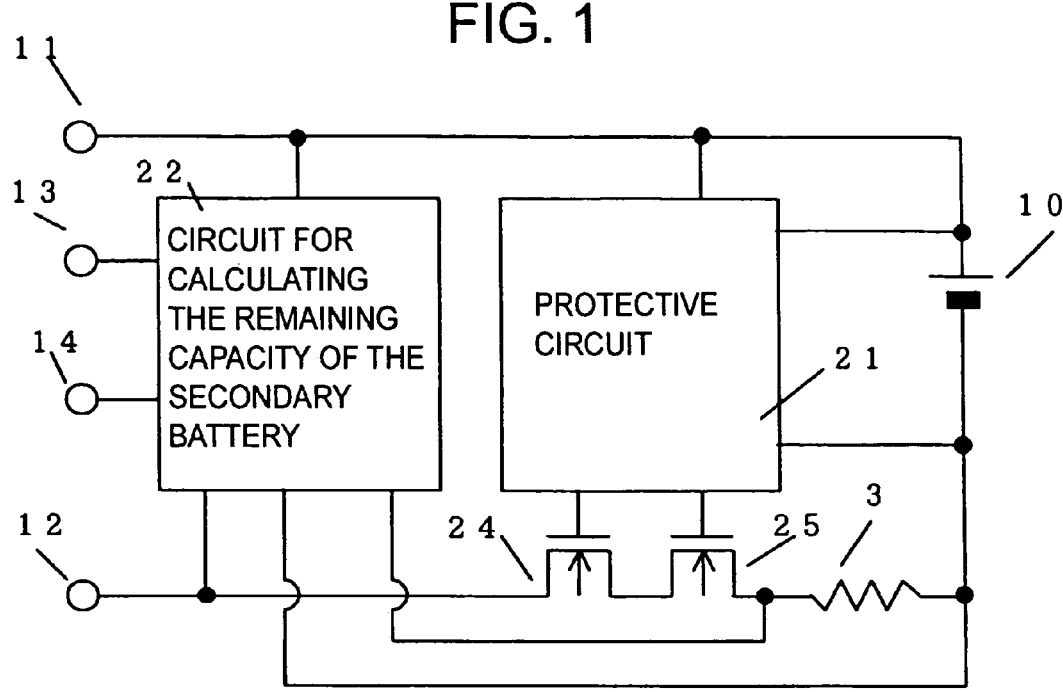
FIG. 1 is an explanatory diagram of a smart battery pack according to Embodiment 1 of the present invention.

An embodiment of the present invention is described below with reference to the accompanying drawings. FIG. 1 shows a smart battery pack according to Embodiment 1 of the present invention. The smart battery pack has, as in the prior art, a plus side terminal 11, a minus side terminal 12, terminals 13 and 14 for communicating with an electronic device, a resistor 3 for current detection, and a secondary battery 10.

While the prior art uses P-channel MOS transistors on the Hi side, the present invention employs N-channel MOS transistors 24 and 25 on the Lo side.

A protection or protective circuit 21 for protecting the secondary battery 10 has a function similar to the one in prior art and controls ON/OFF of the N-channel MOS transistors 24 and 25 in accordance with the state of the secondary battery 10. For instance, when the secondary battery 10 is in an over-discharged state, the protective circuit 21 turns the N-channel MOS transistor 24 off to prohibit discharge whereas the protective circuit 21 turns the N-channel MOS transistor 25 off to stop charging when the secondary battery 10 is in an overcharged state.

N-channel MOS transistors have higher mobility and therefore can be reduced in ON resistance more easily compared to P-channel MOS transistors. ON resistance Ron of a MOS transistor is a function of the gate-source voltage. When the gate-source voltage is given as Vgs and the threshold voltage of the MOS transistor is given as Vt, the ON resistance Ron of when the MOS transistor is in an unsaturated state is in proportion to the reciprocal of (Vgs−Vt). Accordingly, in the case where the battery voltage is high enough to afford a satisfactorily large gate-source voltage of a MOS transistor, it is easy to reduce the ON resistance of the MOS transistor. On the other hand, when a battery has only a small number of serially connected cells (in the case of a 1-serial cell battery), the battery voltage is low (2.5 V to 4.5 V if it is a lithium ion secondary battery) and incapable of providing enough gate-source voltage Vgs for a MOS transistor. This case benefits from the use of an N-channel transistor instead of a P-channel transistor since N-channel transistors are easier to reduce the MOS transistor ON resistance.

The MOS transistors 24 and 25 are in the current flow path and the ON resistance Ron should be small in order to reduce power loss in the MOS transistors 24 and 25.

A calculation circuit 22 for calculating the remaining capacity of the secondary battery 10 has, as in prior art, a function of monitoring the voltage of the secondary battery 10 as well as the electric potential on each end of the current detection resistor 3 to measure a charge current, a discharge current, and the like. The measurement results are transmitted to an electronic device through the communication terminals 13 and 14 (upon request of the electronic device).

With the N-channel MOS transistor switches 24 and 25 put on the Lo side, the electronic device communicates with the smart battery pack using the electric potential of the terminal 12 of the smart battery pack as the reference. On the other hand, the remaining secondary battery power calculating circuit 22 operates with the minus side electric potential of the secondary battery 10 as the reference. This means that turning one of the N-channel MOS transistors 24 and 25 off makes the reference electric potential of the electronic device and the reference electric potential of the smart battery pack different from each other and accordingly makes communications between the two impossible.

Figure 2:
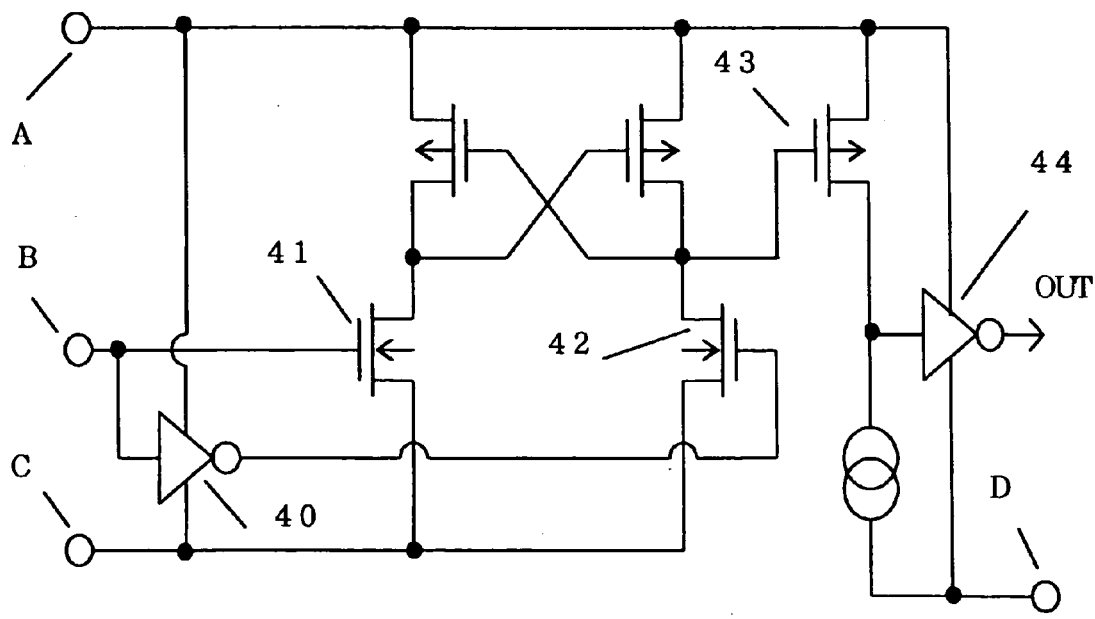
FIG. 2 is a diagram showing an example of a level shifter circuit used in a smart battery pack of the present invention.
Figure 5:
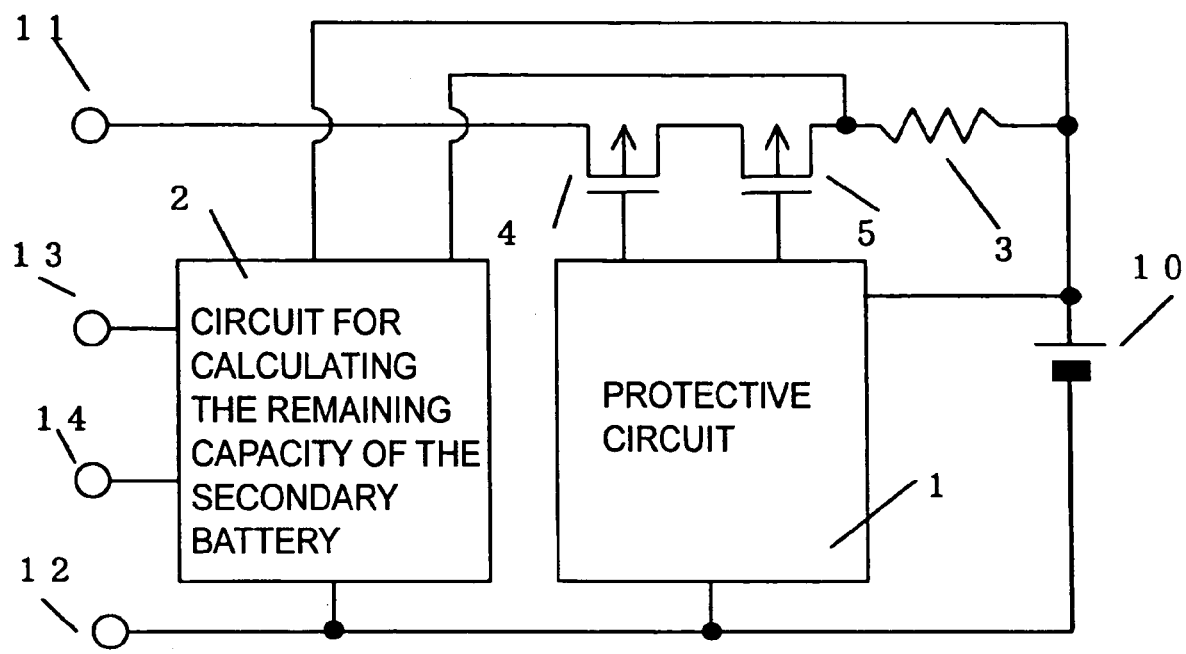
FIG. 5 is an explanatory diagram of a conventional smart battery pack.

The present invention counters this problem by adding, to the remaining secondary battery power calculating circuit 22, a circuit for shifting the electric potential of the terminal 12 toward the minus side electric potential of the secondary battery 10. This level shifter circuit is shown in FIG. 2. A terminal A is connected to the terminal 11 of FIG. 1, a terminal C is connected to the terminal 12 of FIG. 1, and a terminal B is connected to one of the terminals 13 and 14 of FIG. 1 which are used in communications with the electronic device. A terminal D is connected to the minus side of the secondary battery 10 of FIG. 1. Thereby, a signal from the remaining secondary battery power calculating circuit 22 is inputted to a gate of the transistor 41 and to an inverter 40. The inverted signal is inputted to a gate of a transistor 42. The gate voltage of a transistor 43 is changed same as that of the terminal B, so that when the voltage of the terminal B is "H" level, the gate voltage becomes to be "H" level that has an electric potential of the terminal A, and when the voltage of the terminal B is "L" level, the gate voltage becomes to be "L" level that has an electric potential of the terminal C.

The transistor 43 turns ON when a voltage deference between a gate and a source is larger than a threshold voltage of the transistor 43, then input level of the inverter 40 turns "H" level that has an electric potential of the terminal A, so that the output of the inverter 40 becomes to be "L" level that has an electric potential of the terminal D. On the other hand, when the voltage deference between the gate and the source is smaller than the threshold voltage of the transistor 43, the transistor 43 turns OFF, so that the input level of the inverter 40 turns "L" level and its output turns "H" level that has an electric potential of the terminal A. A signal waveform example of the level shifter circuit connected as above is shown in FIGS. 3A and 3B.

In FIGS. 3A and 3B, the horizontal axis indicates time, the vertical axis 3A indicates the voltage of the terminal 13 or 14, and the vertical axis 3B indicates the voltage of OUT of FIG. 2. The lower voltage level of the terminal 13 or 14 of the vertical axis 3A is set to an electric potential V12 of the terminal 12. The lower voltage level of the vertical axis 3B is set to a lower level electric potential V10B of the secondary battery 10 whereas the higher voltage level of the vertical axis 3B is set to an electric potential V11 of the terminal 11.

This enables the smart battery pack having the N-channel MOS transistors on the Lo side to communicate with the electronic device.

To transmit a signal from the smart battery pack to the electronic device, a level shifter circuit as the one shown in FIG. 4 can be employed. In FIG. 4, a terminal A is connected to the terminal 11 of FIG. 1, a terminal C is connected to the terminal 12 of FIG. 1, a terminal B is connected to the terminal 13 or 14 of FIG. 1, and a terminal D is, connected to the minus side of the secondary battery 10 of FIG. 1. In the case of FIG. 2, an input signal having a voltage level between the terminal 11 and the terminal 12 is shifted to an output signal having a voltage level between the terminal 11 and the low side of the secondary battery. In the case of FIG. 4, an input signal having a voltage level between the terminal 11 and the low side of the secondary battery is shifted to an output signal having a voltage level between the terminal 11 and the terminal 12.

Namely, in FIG. 4, when an input voltage of the inverter 30 is "H" level, an output voltage from the inverter 30 becomes to be "L" level, whereby the transistor 32 turns ON, then an input voltage of the inverter 31 becomes to be "H" level and its output voltage becomes to be "L" level that has an electric potential of the terminal C. On the other hand, when an input voltage of the inverter 30 is "L" level, its output voltage becomes to be "H" level, then the transistor 32 turns OFF, an input of the inverter 31 becomes to be "L" level, its output becomes to be "H" level that has an electric potential of the terminal A. In this way, a signal can be transmitted to the electronic device from the circuit for calculating the remaining capacity of the secondary battery.

The remaining secondary battery power calculating circuit 22 in FIG. 1 may have a built-in microcomputer or not. In the case where a microcomputer is incorporated in the remaining secondary battery power calculating circuit 22, the microcomputer is programmed to calculate remaining battery power from the battery voltage measured and from the charge current and the discharge current. The calculation result is sent to the electronic device. The electronic device uses the received data to display remaining battery power. However, a battery pack having a built-in microcomputer is high cost.

In the case where the remaining secondary battery power calculating circuit 22 of FIG. 1 has no built-in microcomputer, a microcomputer in the electronic device is programmed to calculate remaining battery power. The remaining secondary battery power calculating circuit 22 of FIG. 1 in this case merely measures the battery voltage, a charge current and a discharge current, and transmits the measurement data to the microcomputer of the electronic device. From the data received, the microcomputer of the electronic device calculates remaining battery power for display.

This way the smart battery pack does not need to incorporate a microcomputer therein and the cost of the battery pack can be reduced.

A smart battery pack of the present invention can use an N-channel MOS transistor, which is inexpensive and has high performance, as a Lo-side switch. The present invention is therefore capable of providing an inexpensive, high-performance smart battery pack.

What is claimed is:

1. A battery pack with a remaining battery power calculating function, comprising:
    a secondary battery connected to a plus side terminal;
    a protective circuit for protecting the secondary battery from overcharge and over-discharge;
    a calculation circuit operating with a minus side terminal as a reference for calculating a remaining capacity of the secondary battery;
    an N-channel MOS transistor connected between the secondary battery and the minus terminal for controlling charge and discharge of the secondary battery upon receiving a signal from the protective circuit in order to protect the secondary battery; and
    a level shifter circuit connected between the calculation circuit and a communication terminal.

2. A battery pack with a remaining battery power calculating function according to claim 1; wherein the secondary battery is a lithium ion secondary battery.

3. A battery pack with a remaining battery power calculating function according to claim 1; wherein the secondary battery is a 1-serial cell battery.

4. A battery pack with a remaining battery power calculating function according to claim 1; wherein the level shifter circuit shifts an electric potential of the minus side terminal to a negative electrode side electric potential of the secondary battery.

5. A battery pack with a remaining battery power calculating function according to claim 1; wherein the level shifter circuit shifts a negative electrode side electric potential of the secondary battery to an electric potential of the minus side terminal.

6. A battery pack with a remaining battery power calculating function according to claim 1; wherein the secondary battery has a small number of serially connected cells.

7. A battery pack with a remaining battery power calculating function, the battery pack comprising:
    a plus side terminal;
    a minus side terminal;
    a secondary battery connected to the plus side terminal;
    a protection circuit for protecting the secondary battery from overcharge and over-discharge;
    a calculation circuit that uses a minus side electric potential of the secondary battery as a reference to calculate a remaining capacity of the secondary battery;
    an N-channel MOS transistor connected between the secondary battery and the minus side terminal for controlling charge and discharge of the secondary battery in accordance with a signal from the protection circuit; and
    a level shifter circuit connected between the calculation circuit and a communication terminal for shifting an electric potential of the minus side terminal to the minus side electric potential of the secondary battery.

8. A battery pack with a remaining battery power calculating function according to claim 7; wherein the level shifter circuit shifts an input signal having a voltage level between the plus side terminal and the negative side terminal to an output signal having a voltage level between the plus side terminal and a low side of the secondary battery.

9. A battery pack with a remaining battery power calculating function according to claim 7; wherein the secondary battery is a lithium ion secondary battery.

10. A battery pack with a remaining battery power calculating function according to claim 7; wherein the secondary battery is a 1-serial cell battery.

11. A battery pack with a remaining battery power calculating function according to claim 7; wherein the secondary battery has a small number of serially connected cells.

12. A battery pack with a remaining battery power calculating function, the battery pack comprising:
    a plus side terminal;
    a minus side terminal;
    a secondary battery connected to the plus side terminal;
    a protection circuit for protecting the secondary battery from overcharge and over-discharge;
    a calculation circuit that uses a minus side electric potential of the secondary battery as a reference to calculate a remaining capacity of the secondary battery;
    an N-channel MOS transistor connected between the secondary battery and the minus side terminal for controlling charge and discharge of the secondary battery in accordance with a signal from the protection circuit; and
    a level shifter circuit connected between the calculation circuit and a communication terminal for shifting an electric potential of the minus side of the secondary battery to an electric potential of the minus side terminal.

13. A battery pack with a remaining battery power calculating function according to claim 12; wherein the level shifter circuit shifts an input signal having a voltage level between the plus side terminal and a low side of the secondary battery to an output signal having a voltage level between the plus side terminal and the negative side terminal.

14. A battery pack with a remaining battery power calculating function according to claim 12; wherein the secondary battery is a lithium ion secondary battery.

15. A battery pack with a remaining battery power calculating function according to claim 12; wherein the secondary battery is a 1-serial cell battery.

16. A battery pack with a remaining battery power calculating function according to claim 12; wherein the secondary battery has a small number of serially connected cells.

* * * * *